J. M. Wood,

Osier Peeler.

No 1,147. Reissued Feb. 26, 1861.

Witnesses
J. W. Coombs
H. S. Spencer

Inventor
J. M. Wood,
per Munn & Co
Attorneys.

UNITED STATES PATENT OFFICE.

JOHN M. WOOD, OF SENECA, NEW YORK.

WILLOW-PEELER.

Specification forming part of Letters Patent No. 29,535, dated August 7, 1860; Reissue No. 1,147, dated February 26, 1861.

*To all whom it may concern:*

Be it known that I, JOHN M. WOOD, of Seneca, in the county of Ontario and State of New York, have invented a new and Improved Machine for Peeling Willows, &c.; and I do hereby declare that the following is a full, clear, and exact description of the same, reference being had to the accompanying drawings, forming a part of this specification, in which—

Figure 1:
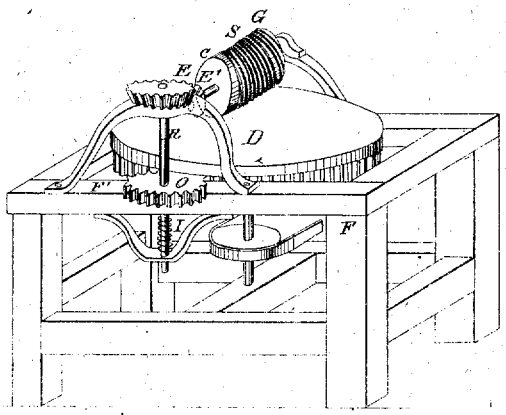
Figure 2:
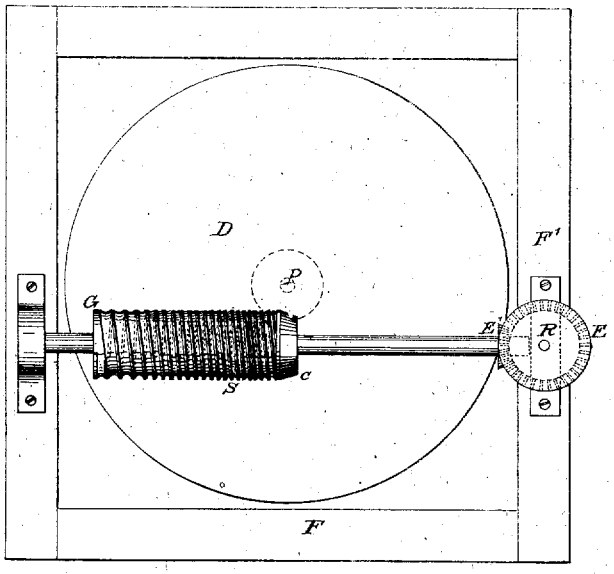

Figure 1 represents a perspective view of my invention. Fig. 2 is a plan or top view of the same.

Similar letters of reference in both views indicate corresponding parts.

My invention consists in the arrangement of a circular revolving disk with a superincumbent roller having a graduated screw on its surface, and so arranged in reference to the disk that when they are both in motion twigs of willow, or other twigs of a similar nature, will pass between them and be speedily denuded of their bark, leaving the twig in the proper condition for manufacturing purposes.

To enable those skilled in the art to make and use my invention, I will proceed to describe its construction and operation with reference to the drawings.

The working parts of my machine are supported by a suitable frame, F, made of wood or of any other convenient material. This frame forms the bearings for the vertical shaft P, to the upper end of which the disk D is firmly attached. The upper surface of this disk is covered with some suitable material—such as gutta-percha, india-rubber, or leather, or with sheet metal, sheet-copper being the best—so that it forms a friction-surface, and on the lower end of its periphery cogs are made, which gear into the wheel O on the arbor R. On the upper end of this shaft is the bevel-wheel E, which gears into a bevel-wheel, E′, on the shaft of the screw-cylinder S. Motion is imparted to these parts by means of a pulley on the shaft P, or in most cases it may be found to be most convenient to extend the shaft of the screw-cylinder beyond its bearings, thereby affording room for a pulley which may serve as the driving-pulley of the machine. The arbor R passes freely through the top bar, F′, of the frame, and it is journaled in two stirrups, which are firmly secured to said frame. It is so arranged that it is allowed to rise and fall freely, a spiral spring, H, being placed around it to keep it down. A similar spring is arranged on the opposite end of the shaft of the screw-cylinder so that this cylinder is allowed to rise and fall freely and to accommodate itself to the sudden irregularities of the twigs passing through between the disk D and the screw-cylinder S. Instead of arranging the springs on the ends of the screw-cylinder, however, the shaft P of the disk D might be so arranged that it will allow said disk to rise and fall simply by placing a spring under this shaft, and in both cases the springs must be so regulated that when nothing interferes between the screw-cylinder and the disk the surfaces of the two are in contact with each other, and at the same time the spring or springs must be sufficiently strong to exert the necessary pressure to denude or peel the twigs passing through between the two surfaces. In order to facilitate the operation, the end *c* of the screw-cylinder is slightly conical, so that it readily seizes the thin ends of the twigs and carries them into the screwed part of the cylinder. The thread on the surface of the cylinder S is gradually increasing, being finest at or near to the end *c*, and it terminates in a circular groove, G, at the opposite end. By thus increasing the thread it accommodates itself to the gradually-increasing thickness of the twigs; and I have made said thread to terminate in a circular groove, thereby facilitating the passage of the twigs from the machine. This groove, however, is not essential.

The operation is as follows: When the machine is in motion, the twigs are fed to the screw-cylinder S one after the other by putting the small ends of the same at the conical end *c* of the cylinder. The twig is at once caught and drawn toward the screw and speedily stripped, and at the same time that the stripping process is in progress the twig is carried along toward the end G, where it is thrown out entirely denuded. Sudden inequalities in the twigs are provided for by the arrangement of the springs or spring, which allow the rubbing-surfaces to accommodate themselves readily to every part of the twig operating on it at all times.

Having thus fully described my invention, what I claim as new, and desire to secure by Letters Patent, is—

1. The circular friction-disk D with its suitable covering, as and for the purpose described.

2. The screw-cylinder S with its conical-shaped end and variable thread, and with or without a circular groove, as and for the purpose set forth.

3. The combination of the disk D and screw-cylinder S with adjusting-springs, substantially in the manner and for the purpose specified.

J. M. WOOD.

Witnesses:
JOHN WHITEWELL,
GEO. B. DUSINBERRE.